US012739651B2

(12) United States Patent
Du

(10) Patent No.: US 12,739,651 B2
(45) Date of Patent: Sep. 15, 2026

(54) RESOURCE ALLOCATION METHOD, APPARATUS, SERVER AND STORAGE MEDIUM

(71) Applicant: ZTE CORPORATION, Shenzhen (CN)

(72) Inventor: Yongsheng Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 259 days.

(21) Appl. No.: 18/718,847

(22) PCT Filed: Nov. 29, 2022

(86) PCT No.: PCT/CN2022/134871
§ 371 (c)(1),
(2) Date: Jun. 12, 2024

(87) PCT Pub. No.: WO2023/109496
PCT Pub. Date: Jun. 22, 2023

(65) Prior Publication Data
US 2025/0048117 A1 Feb. 6, 2025

(30) Foreign Application Priority Data
Dec. 13, 2021 (CN) ........................ 202111521921.9

(51) Int. Cl.
*H04W 16/14* (2009.01)
*H04W 72/04* (2023.01)

(52) U.S. Cl.
CPC .......... *H04W 16/14* (2013.01); *H04W 72/04* (2013.01)

(58) Field of Classification Search
CPC ..... H04W 16/04; H04W 16/14; H04W 72/53; H04W 72/52; H04W 16/10; H04W 72/04; H04W 72/0453
See application file for complete search history.

(56) References Cited

U.S. PATENT DOCUMENTS 11,178,577 B1 11/2021 Narendran et al.
11,412,525 B1 * 8/2022 Chen .................. H04W 72/543
(Continued)

FOREIGN PATENT DOCUMENTS

CN 109565841 A 4/2019
CN 110784334 A 2/2020
(Continued)

OTHER PUBLICATIONS

International Search Report and Written Opinion issued in PCT/CN2022/134871, mailed Feb. 10, 2023, 11 pgs.
(Continued)

*Primary Examiner* — Ricky Q Ngo
(74) *Attorney, Agent, or Firm* — HAUPTMAN HAM, LLP

(57) ABSTRACT

Embodiments of the present application relate to the technical field of communication, and relate to a resource allocation method, apparatus, server and storage medium. The resource allocation method includes: obtaining the first communication load array of the first historical period of designated DSS cell group; based on a preset prediction algorithm, obtaining first predicted communication load of the DSS cell group according to the first communication load array; predicting the communication load of the DSS cell group according to a preset communication load prediction model, and obtaining the second predicted communication load of the DSS cell group, the communication load prediction model is obtained by training based on the second communication load array of the second historical period of the DSS cell group, and the second historical period is greater than the first historical period; determining a
(Continued)

resource allocation strategy of the DSS cell group according to a difference between the first predicted communication load and the second predicted communication load, and allocating resources to the DSS cell group according to the resource allocation strategy.

10 Claims, 5 Drawing Sheets

(56) References Cited

U.S. PATENT DOCUMENTS

| | | | | |
|---|---|---|---|---|
| 2006/0252418 | A1 | 11/2006 | Quinn et al. | |
| 2021/0235473 | A1* | 7/2021 | Parekh | H04W 72/542 |
| 2022/0150713 | A1* | 5/2022 | Zhou | H04W 72/1263 |
| 2022/0182843 | A1* | 6/2022 | Park | H04W 16/14 |
| 2022/0338208 | A1* | 10/2022 | Chen | H04W 28/0967 |
| 2023/0164576 | A1* | 5/2023 | Ponugoti | H04W 16/14 370/329 |

FOREIGN PATENT DOCUMENTS

| | | | |
|---|---|---|---|
| JP | 2021035055 | A | 3/2021 |
| WO | 2012001772 | A1 | 1/2012 |
| WO | 2021079178 | A1 | 4/2021 |

OTHER PUBLICATIONS

Electronic Meeting. "Core part: NR Dynamic spectrum sharing (DSS)", Rapporteur: Ravikiran Nory, Ericsson, company, Dec. 7-11, 2020, 9 pgs.

Hooli, Kari et al: "WINNER Spectrum Aspects: Methods for efficient sharing, flexible spectrum use and coexistence"; Information Society Technologies, Winner No. D6.1 v1.0; Oct. 30, 2004; pp. 1-88.

Communication and Supplemental European Search Report issued in European Application No. 22906247.6; mailed Mar. 11, 2025; 6 pages.

First Office Action in Corresponding Japanese Patent Application No. 2024-535377, mailed Jul. 8, 2025; 4 pgs.

* cited by examiner

RESOURCE ALLOCATION METHOD, APPARATUS, SERVER AND STORAGE MEDIUM

CROSS-REFERENCES TO RELATED APPLICATIONS

The present application is a U.S. National Phase application of International Application No. PCT/CN2022/134871, filed on Nov. 29, 2022, which claims priority to Chinese Patent Application NO. 202111521921.9, filed on Dec. 13, 2021.

TECHNICAL FIELD

The present application relates to the technical field of communication, and in particular to a resource allocation method and apparatus, a server and a storage medium.

BACKGROUND

Dynamic Spectrum Sharing (DSS) allows 4G long term evolution (4G LTE) and 5G new radio (5G NR) to share the same spectrum and dynamically allocates time-frequency resources to 4G and 5G users. The spectrum resources are dynamically and flexibly allocated for different standards of technology within the same frequency band. This is because the 5G NR physical layer design has similarities with 4G LTE, which is the basis for dynamic spectrum sharing between 4G and 5G. The implementation principle is to schedule NR users in LTE subframes under the same subcarrier spacing and similar time domain structure. First, it is necessary to ensure that the respective public channels in the 4G and 5G networks are independent of each other and not affected by each other, such as ensuring that a reference signal of 5G NR and the reference signal of LTE will not conflict in time-frequency resource allocation, and then user data of 5G NR is inserted into the LTE subframe. Currently, there are spectrum resource sharing technologies of three types of resource allocation based on multicast broadcast single frequency network (MBSFN), 5G-based mini-slot and rate matching-based.

However, when the above spectrum resources are dynamically allocated, how many resources should be allocated to 5G, The current basic principle is to analyze the activity patterns of 4G users and 5G users by learning past channel states, so as to make predictions about future spectrum resource usage. This prediction is smarter and more consistent with the definition of cognitive radio. However, due to the limitation of computing and storage resources of network elements, this kind of prediction is more in the form of real-time prediction, using only the data of the first few cycles of the current moment for statistical evaluation to determine the resource allocation method in the next stage. This method will inevitably cause prediction failures due to the long-term development trends of 4G users and 5G users, the impact of emergencies, and daily tidal effects, resulting in a mismatch between predicted resources and actual business needs, affecting user experience.

SUMMARY

The main purpose of the embodiments of the present application is to provide a resource allocation method, apparatus, server and storage medium, which aims to improve the accuracy of the spectrum resource allocation method of the determined DSS cell group, so that the predicted resources match actual business needs.

To achieve the above purpose, embodiments of the present application provide a resource allocation method, including:

obtaining a first communication load array of a first historical period of a specified dynamic spectrum sharing (DSS) cell group;

based on a preset prediction algorithm, obtaining a first predicted communication load of the DSS cell group according to the first communication load array;

predicting a communication load of the DSS cell group according to a preset communication load prediction model to obtain a second predicted communication load of the DSS cell group, the communication load prediction model is obtained by training based on a second communication load array of a second historical period of the DSS cell group, and the second historical period is greater than the first historical period; and determining a resource allocation strategy of the DSS cell group according to a difference between the first predicted communication load and the second predicted communication load, and allocating resources to the DSS cell group according to the resource allocation strategy.

To achieve the above purpose, embodiments of the present application also provide a resource allocation apparatus, including:

an obtaining module, configured to obtain a first communication load array of a first historical period of specified dynamic spectrum sharing (DSS) cell group;

a first prediction module, configured to obtain first predicted communication load of the DSS cell group according to the first communication load array, based on a preset prediction algorithm;

a second prediction module, configured to predict communication load of the DSS cell group according to a preset communication load prediction model, and obtaining second predicted communication load of the DSS cell group, the communication load prediction model is obtained by training based on the second communication load array of the second historical period of the DSS cell group, and the second historical period is greater than the first historical period; and a resource allocation module, configured to determine a resource allocation strategy of the DSS cell group based on a difference between the first predicted communication load and the second predicted communication load, and allocate resources to the DSS cell according to the resource allocation strategy.

To achieve the above purpose, embodiments of the present application also provide a server, including:

at least one processor; and a memory communicated with the at least one processor;

an instruction executable by the at least one processor is stored in the memory, and the instruction is executed by the at least one processor to enable the at least one processor to perform the resource allocation method as describer above.

To achieve the above purpose, embodiments of the present application also provide a computer-readable storage medium in which a computer program is stored, and when the computer program is executed by a processor, the resource allocation method as describer above is implemented.

In the resource allocation method provided in the present application, during the process of resource allocation of the DSS cell groups, obtaining a first communication load array of a first historical period of a specified DSS cell group; based on a preset prediction algorithm, obtaining a first predicted communication load of the DSS cell group according to the first communication load array; predicting a communication load of the DSS cell group according to a preset communication load prediction model to obtain a second predicted communication load of the DSS cell group, the communication load prediction model is obtained by training based on a second communication load array of a second historical period of the DSS cell group, and the second historical period is greater than the first historical period; and determining a resource allocation strategy of the DSS cell group according to a difference between the first predicted communication load and the second predicted communication load, and allocating resources to the DSS cell group according to the resource allocation strategy. The difference between the first predicted communication load obtained from short-term historical data and the second predicted communication load obtained from long-term historical data, is used to determine the resource allocation method of the DSS cell group. Therefore, the present application can improve the accuracy of the determined spectrum resource allocation method of the DSS cell group, so that the predicted resources match actual business needs; it solves the problem of low accuracy of resource allocation in DSS cell groups caused by the existing technology that only relies on multiple short-term historical data to evaluate the resource allocation method, a mismatch between predicted resources and actual business needs, which affects user experience.

DETAILED DESCRIPTION OF THE EMBODIMENTS

In order to make the purpose, technical solutions and advantages of the present application clearer, embodiments in the present application will be described in detail below in conjunction with the accompanying drawings. However, those skilled in the art can understand that in each embodiment of the present application, many technical details are provided to enable readers to better understand the present application. However, even without these technical details and various changes and modifications based on the following embodiments, the technical solution claimed in the present application can also be implemented. The division of the following embodiments is for the convenience of description and should not constitute any limitation on the specific implementation of the present application. The various embodiments can be combined with each other and quoted from each other on the premise that there is no contradiction.

Dynamic spectrum sharing (DSS) technology is conducive to the smooth evolution from 4G to 5G, reduces 5G investment costs, and solves the problem of many 4G users and few 5G users in the early stages of 5G development. At the same time, it can also solve the problem of higher 5G frequency bands and weaker signal penetration capabilities through 4G signals. The current dynamic spectrum allocation method generally conducts multiple confirmation and evaluation based on the current number and load of access users of 4G users and 5G users, and finally adjusts the spectrum resources allocated to 4G users and 5G users in the next stage for 4G users and 5G users to access the terminal. Under this strategy, there are the following two problems: 1. handover delay problem, because the traffic and load of the current 4G users and 5G users need to be confirmed and evaluated multiple times in the previous cycles before the next resource allocation can be carried out, the handover delay will be long. If we are currently facing a long period of user traffic and load, due to the long evaluation time, the traffic quality loss will be greater and user experience will be damaged. In addition, if the dynamic conversion time is too long, for example, reaching 100 ms, it will cause the DSS cell group scheduler to switch from 4G to 5G only when the traffic of some 5G users has switched from peak to trough, and the 5G users at this time no longer need to be scheduled. 2. Accuracy rate problem: This resource allocation method for the next cycle, which only relies on real-time evaluation of the previous cycles, is relatively simple and has low accuracy. It is prone to mismatch between the estimated resources and actual business needs, affecting the user experience.

Figure 1:
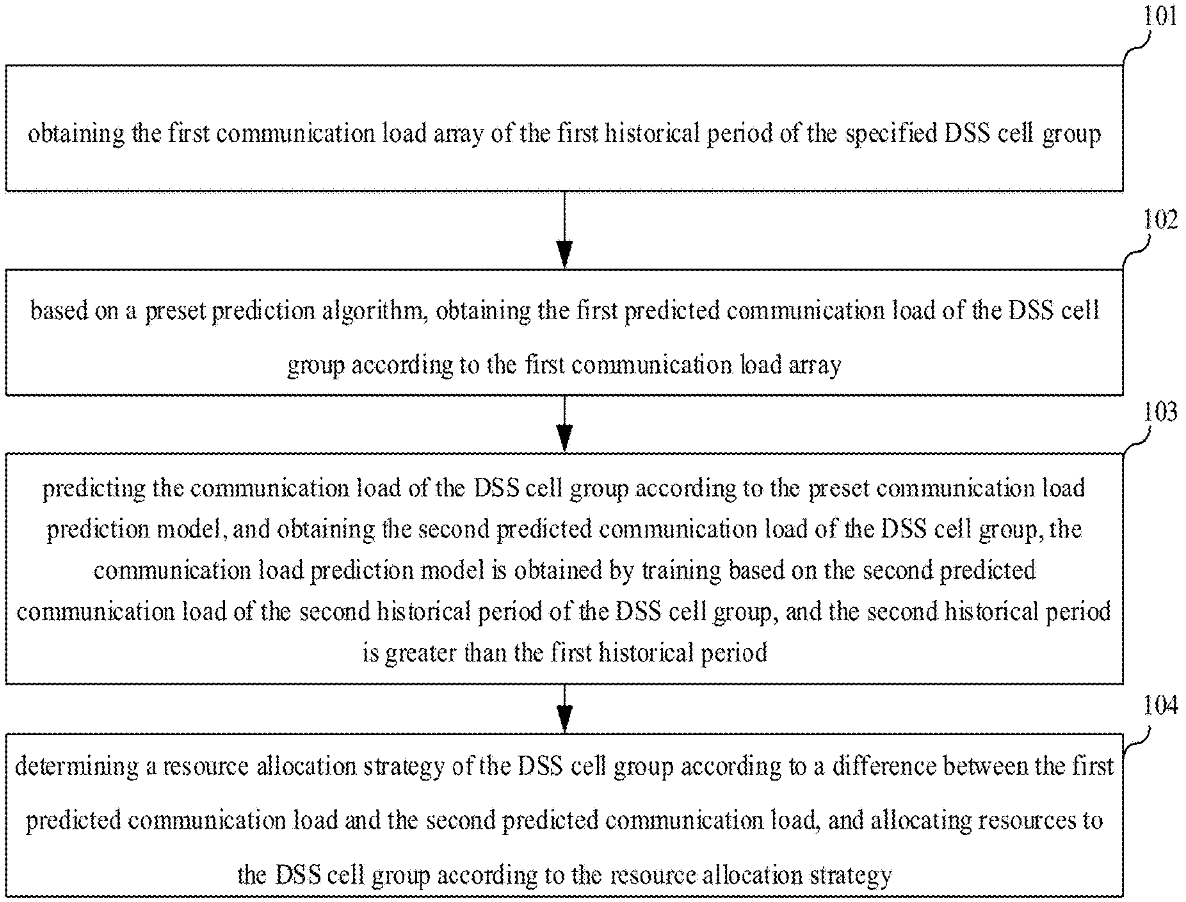
FIG. 1 is a flow chart of a resource allocation method according to an embodiment of the present application.

An embodiment of the present application relates to a resource allocation method, as shown in FIG. 1, applied to a base station, including:

step 101, obtaining the first communication load array of the first historical period of the specified DSS cell group.

In an embodiment, the DSS cell group is designated in the computing management center of the base station. After the DSS cell group is designated, the first communication load array of the first historical period of the specified DSS cell group is obtained from the database that stores the historical communication load array of the DSS cell group according to the cell group identifier of the designated DSS cell group. The first historical period can define the number of historical periods, for example, the first historical period refers to the past N periods. The first historical period can also define the length of the historical period, for example, the first historical period refers to all periods within the past 3 hours. Here is no specific limitation on the first historical period. The first communication load array is actually composed of the communication loads of each historical period in the first historical period. Each communication load refers to the communication-related indicators that the operator is concerned about, such as call volume, uplink and downlink traffic, or weighted calculation indicators of both, etc.

Step 102, based on a preset prediction algorithm, obtaining the first predicted communication load of the DSS cell group according to the first communication load array.

In an embodiment, the prediction algorithm can be to calculate the trend of the communication load according to each communication load in the first communication load array, and to obtain the first predicted communication load of the DSS cell group according to the trend of the communication load. The prediction algorithm can also be to average each communication load in the first communication load array, and to use the calculated average as the first predicted communication load of the DSS cell group. The first predicted communication load of the DSS cell group refers to the communication load prediction value of the DSS cell group in the next period.

Step 103, predicting the communication load of the DSS cell group according to the preset communication load prediction model, and obtaining the second predicted communication load of the DSS cell group, where the communication load prediction model is obtained by training based on the second predicted communication load of the second historical period of the DSS cell group, and the second historical period is greater than the first historical period.

In an embodiment, the communication load prediction model is an intelligent model that can independently deduce the communication load of the DSS cell group in a certain period or a future period. Therefore, the communication load of the DSS cell group can be inferred through the communication load prediction model, and the second predicted communication load of the DSS cell group is obtained. The second predicted communication load of the DSS cell group refers to the communication load prediction value of the DSS cell group in the next period; the first predicted communication load and the second predicted communication load are the communication load prediction value of the DSS cell group in the same period. The difference between the first predicted communication load and the second predicted communication load is that: the first predicted communication load is inferred from shorter historical period data (such as the past few period), and can be called the communication load of short-term inference, while the second predicted communication load is inferred from long historical period data (such as the past few months or even years), and can be called the communication load of long-term inference.

In an embodiment, the communication load prediction model is obtained by training based on the second communication load array of the second historical period of the DSS cell group. The second historical period defines the length of the historical period. For example, the second historical period refers to the entire period in the past 3 months or 1 year. Compared with the first historical period, the number of historical periods included in the second historical period is much greater than the number of historical periods included in the first historical period. The second communication load array is actually composed of the communication loads of each historical period within the second historical period.

Step 104, determining a resource allocation strategy of the DSS cell group according to a difference between the first predicted communication load and the second predicted communication load, and allocating resources to the DSS cell group according to the resource allocation strategy.

Figure 2:
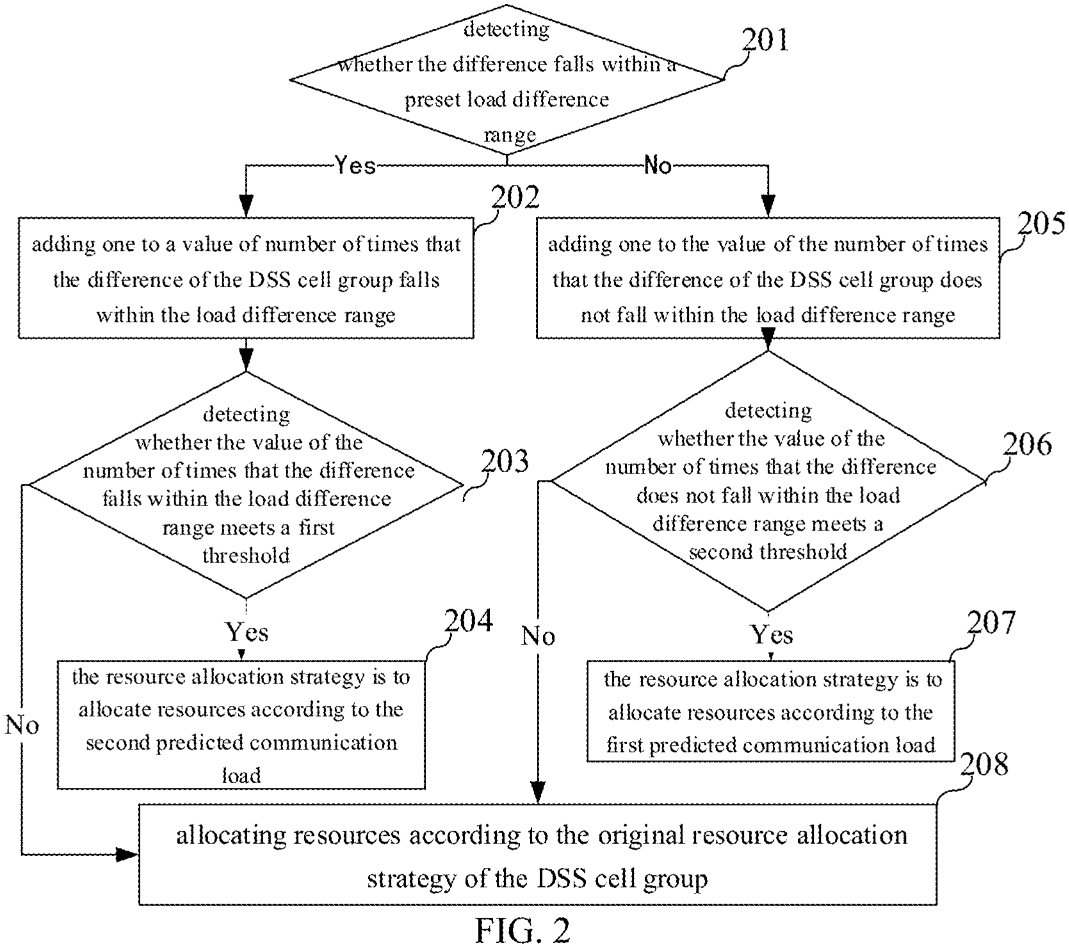
FIG. 2 is a flow chart of step 104 of the resource allocation method according to an embodiment of the present application.

In an embodiment, determining the resource allocation strategy of the DSS cell group according to the difference between the first predicted communication load and the second predicted communication load actually is determining the accuracy of the first predicted communication load and the second predicted communication load according to the difference. Specifically, the process of determining the resource allocation strategy of the DSS cell group according to the difference between the first predicted communication load and the second predicted communication load is shown in FIG. 2, including:

Step 201, detecting whether the difference falls within a preset load difference range.

In an embodiment, the load difference range is actually the tolerance range of the difference between the first predicted communication load and the second predicted communication load. When the difference is within the load difference range, step 202 is performed; when the difference is not within the load difference range, step 205 is performed.

Step 202, adding one to a value of number of times that the difference of the DSS cell group falls within the load difference range.

In an embodiment, when the difference between the first predicted communication load and the second predicted communication load falls within the load difference range, it means that the values predicted by the two prediction methods are relatively close, but at this time, it cannot be determined whether to use the first predicted communication load or the second predicted communication load for resource allocation, it is necessary to add one to the value of the number of times that the difference of the DSS cell group falls within the load difference range on the original basis. The value of the number of times that the difference of the DSS cell group falls within the load difference range is always cumulative, and will not be cleared.

Step 203, detecting whether the value of the number of times that the difference falls within the load difference range meets a first threshold.

In an embodiment, the value of the number of times that the difference falls within the load difference range is set with a corresponding first threshold, and the first threshold represents the number of occurrences of the difference between the first predicted communication load and the second predicted communication load within the load difference range. When the value of the number of times that the difference falls within the load difference range reaches the first threshold, step 204 is performed. When the value of the number of times that the difference falls within the load difference range does not reach the first threshold, step 208 is performed.

Step 204, allocating, by the resource allocation strategy, resources according to the second predicted communication load.

In an embodiment, when the value of the number of times that the difference falls within the load difference range reaches the first threshold, the corresponding resource allocation strategy is to allocate resources to the DSS cell group according to the second predicted communication load.

Step 205, adding one to the value of the number of times that the difference of the DSS cell group does not fall within the load difference range.

In an embodiment, when the difference between the first predicted communication load and the second predicted communication load does not fall within the load difference range, it means that the values predicted by the two prediction methods are far apart, but at this time, it cannot be determined whether to use the first predicted communication load or the second predicted communication load for resource allocation, it is necessary to add one to the original value of the number of times that the difference of the DSS cell group does not fall within the load difference range. The value of the number of times that the difference does not fall within the load difference range of the DSS cell group is always accumulating and will not be cleared.

Step 206, detecting whether the value of the number of times that the difference does not fall within the load difference range meets a second threshold.

In an embodiment, the value of the number of times that the difference does not fall within the load difference range is set with a corresponding second threshold, and the second threshold represents the number of times that the difference between the first predicted communication load and the second predicted communication load is beyond the load difference range. When the value of the number of times that the difference does not fall within the load difference range reaches the second threshold, step 207 is performed. When the value of the number of times that the difference does not fall within the load difference range does not reach the second threshold, step 208 is performed.

Step 207, allocating, by the resource allocation strategy, resources according to the first predicted communication load.

In an embodiment, when the value of the number of times that the difference does not fall within the load difference range reaches the second threshold, the corresponding resource allocation strategy is to allocate resources to the DSS cell group according to the first predicted communication load.

Step 208, allocating resources according to the original resource allocation strategy of the DSS cell group.

In an embodiment, when the value of the number of times that the difference falls within the load difference range does not reach the first threshold, and when the value of the number of times that the difference does not fall within the load difference range reaches the second threshold, resource is allocated according to the original resource allocation strategy of the DSS cell group.

In an embodiment, after the resource allocation strategy is determined, the spectrum resources of the DSS cell group are allocated according to the determined resource allocation strategy. When the determined resource allocation strategy is to allocate resource according to the first predicted communication load, it is necessary to add 1 to the value of the first resource allocation times of the DSS cell group. When the value of the first resource allocation times meets a preset third threshold, it means that the communication load prediction model has aged and a new round of communication load prediction model training needs to be started to update the communication load prediction model. The third threshold refers to the total number of times that the second predicted communication load and the first predicted communication load are inconsistent within a certain time range. For example, the number of inconsistencies within 100 times is 30, the communication load prediction model needs to be updated, and at the 101st prediction, the value of the first resource allocation number will be updated to 0.

In the embodiment of the present application, during the resource allocation process of the DSS cell group, the first communication load array of the first historical period of the designated DSS cell group is obtained; based on the preset prediction algorithm, the first predicted communication load of the DSS cell group is obtained according to the first communication load array; the communication load of the DSS cell group is predicted according to the preset communication load prediction model, and the second predicted communication load of the DSS cell group is obtained. The communication load prediction model is obtained by training based on the second communication load array of the second historical period of the DSS cell group, and the second historical period is greater than the first historical period. The resource allocation strategy of the DSS cell group is determined according to the difference between the first predicted communication load and the second predicted communication load, and the resources are allocated to the DSS cell group according to the resource allocation strategy. The difference between the first predicted communication load obtained from short-term historical data and the second predicted communication load obtained from long-term historical data, is used to determine the resource allocation method of the DSS cell group. Therefore, the present application can improve the accuracy of the determined spectrum resource allocation method of the DSS cell group, so that the predicted resources match actual business needs; it solves the problem of low accuracy of resource allocation in DSS cell groups caused by the existing technology that only relies on multiple short-term historical data to evaluate the resource allocation method, a mismatch between predicted resources and actual business needs, which affects user experience.

Figure 3:
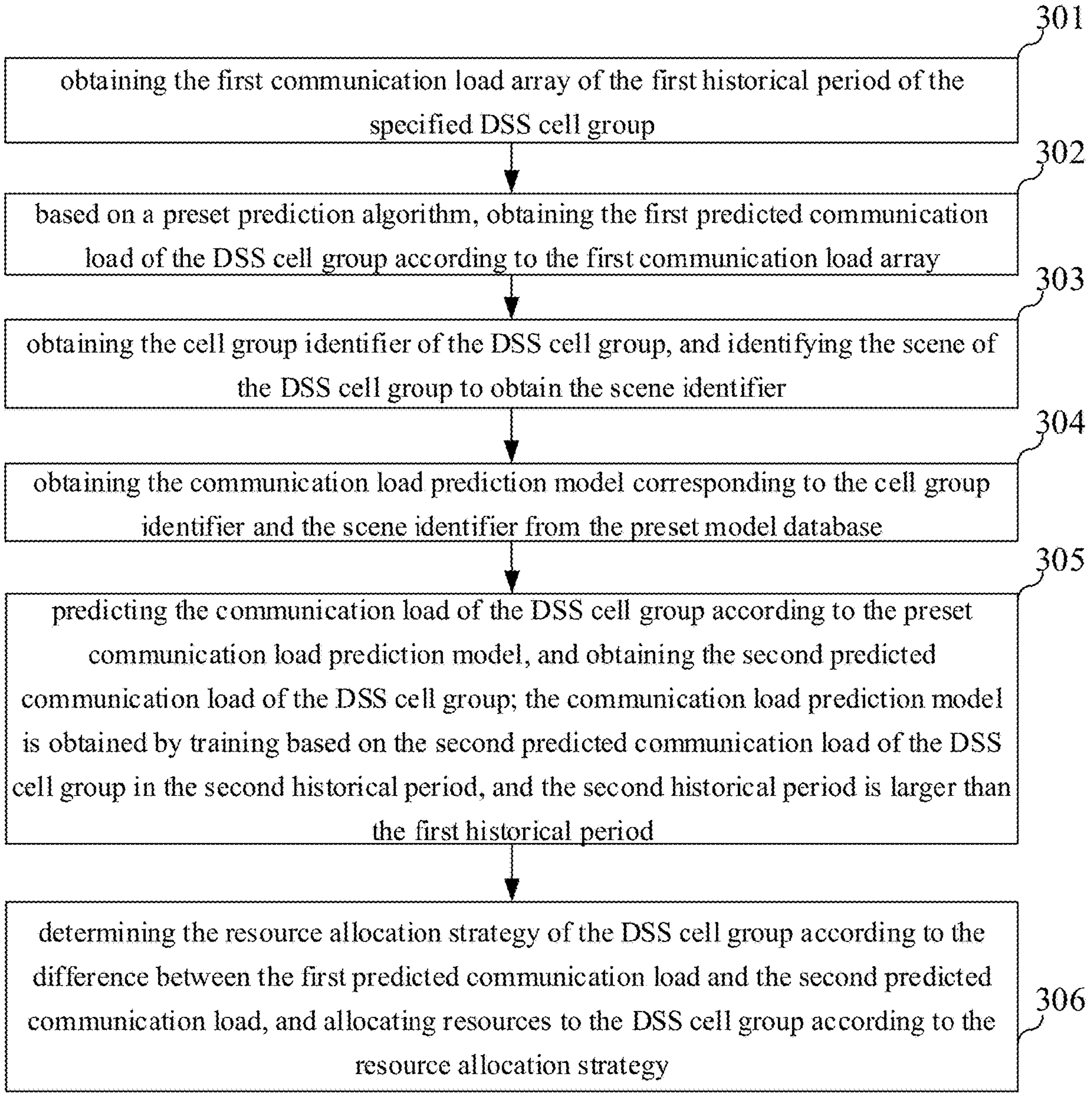
FIG. 3 is a flow chart of the resource allocation method according to an embodiment of the present application.

An embodiment of the present application relates to a resource allocation method, as shown in FIG. 3, applied to a base station, including step 301, obtaining the first communication load array of the first historical period of the specified DSS cell group.

In an embodiment, this step is substantially the same as step 101 in the embodiment of the present application, and will not be described again here.

Step 302, based on a preset prediction algorithm, obtaining the first predicted communication load of the DSS cell group according to the first communication load array.

In an embodiment, this step is substantially the same as step 102 in the embodiment of the present application, and will not be described again here.

Step 303, obtaining the cell group identifier of the DSS cell group, and identifying the scene of the DSS cell group to obtain the scene identifier.

In an embodiment, the cell group identifier is the only one that can identify the designated DSS cell group. After the DSS cell group is designated, scene identification can be performed on the designated DSS cell group, the scene in which the current DSS cell group is located can be obtained, and the scene identifier can be generated. For example, the scene identifier can be a hot spot venue.

Step 304, obtaining the communication load prediction model corresponding to the cell group identifier and the scene identifier from the preset model database.

In an embodiment, the model database is in the computing management center of the base station, and each communication load prediction model is also trained and generated through the computing management center of the base station. When generating each communication load prediction model, it is first necessary to obtain the second communication load array of the second historical period of the DSS cell group in each scene. Then, for each scene, based on the preset loss function, the second communication load array corresponding to the scene is input into the pre-training model for training, and the communication load prediction model corresponding to the scene is generated. After generating the communication load prediction model for each scene, the communication load prediction model corresponding to the scene is saved to the model database according to the DSS cell group and scene. The loss function refers to the difference between the predicted communication load and the actual communication load. The training process refers to iterating the model parameters according to the value of the loss function.

In an embodiment, when obtaining the communication load prediction model corresponding to the cell group identifier and scene identifier, the cell group identifier and scene identifier need to be sent to the computing management center of the base station, and the computing management center obtains the corresponding model from the model database and return. When the communication load prediction model corresponding to the cell group identifier and scene identifier is not obtained from the model database, it means that the communication load prediction model corresponding to the cell group identifier and scene identifier is immature and cannot be put into use. At this time, a general communication load prediction model can be obtained from the model database as a communication load prediction model.

Step 305, predicting the communication load of the DSS cell group according to the preset communication load prediction model, and obtaining the second predicted communication load of the DSS cell group. The communication load prediction model is obtained by training based on the second predicted communication load of the DSS cell group in the second historical period. The second historical period is larger than the first historical period.

In an embodiment, this step is substantially the same as step 103 in the embodiment of the present application, and will not be described again here.

Step 306, determining the resource allocation strategy of the DSS cell group according to the difference between the first predicted communication load and the second predicted communication load, and allocating resources to the DSS cell group according to the resource allocation strategy.

In an embodiment, this step is substantially the same as step 104 in the embodiment of the present application, and will not be described again here.

In the embodiment of the present application, on the basis of other embodiments, the scene of the DSS cell group can also be identified, and the corresponding communication load prediction model can be selected according to the scene of the DSS cell group, so that the obtained second predicted communication load can be more suitable for actual application scenes and more accurate.

Figure 4:
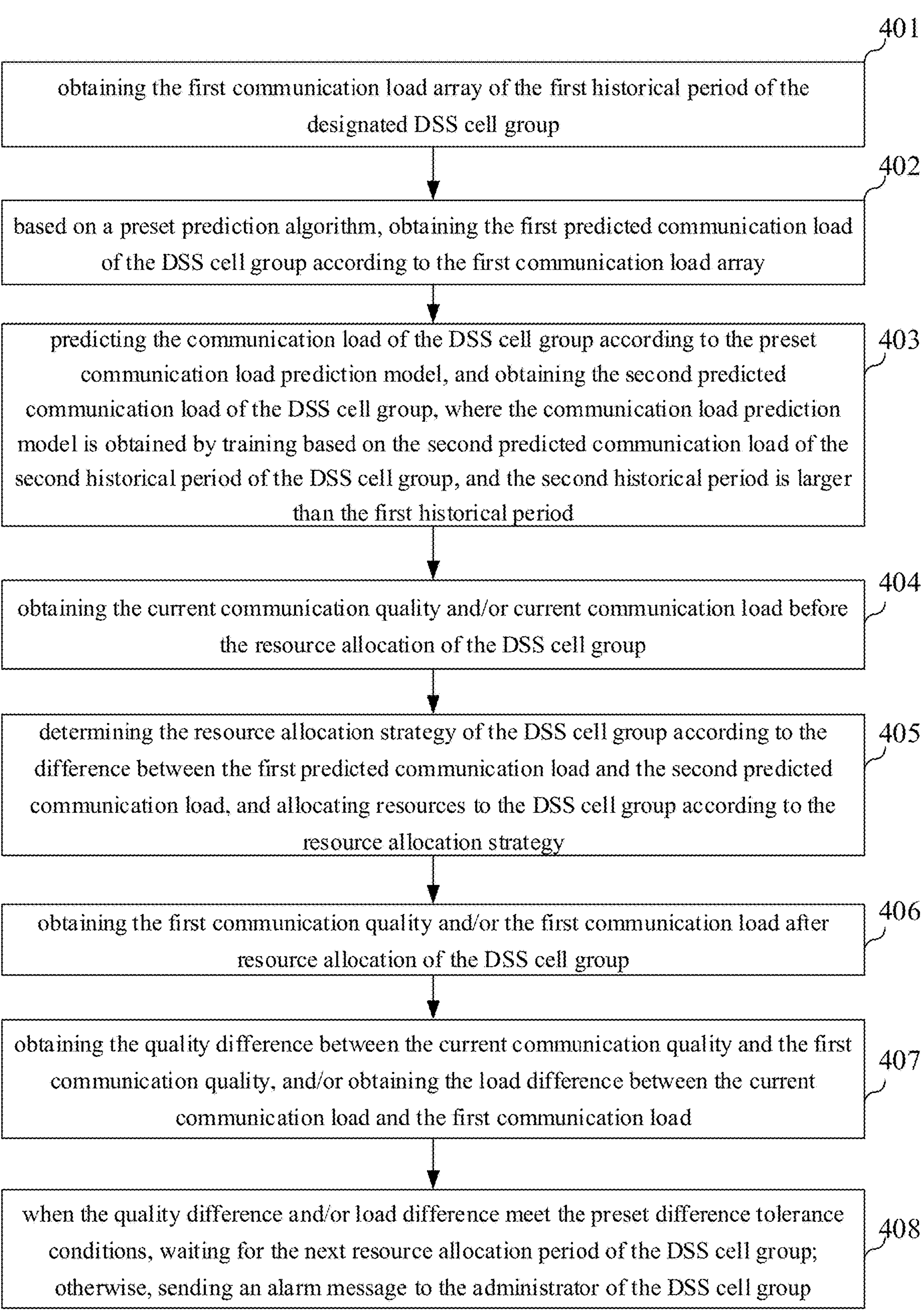
FIG. 4 is a flow chart of the resource allocation method according to an embodiment of the present application.

An embodiment of the present application relates to a resource allocation method, as shown in FIG. 4, applied to a base station, including:

step 401, obtaining the first communication load array of the first historical period of the designated DSS cell group.

In an embodiment, this step is substantially the same as step 101 in the embodiment of the present application, and will not be described again here.

Step 402, based on a preset prediction algorithm, obtaining the first predicted communication load of the DSS cell group according to the first communication load array.

In an embodiment, this step is substantially the same as step 102 in the embodiment of the present application, and will not be described again here.

Step 403, predicting the communication load of the DSS cell group according to the preset communication load prediction model, and obtaining the second predicted communication load of the DSS cell group. The communication load prediction model is obtained by training based on the second predicted communication load of the second historical period of the DSS cell group. The second historical period is larger than the first historical period.

In an embodiment, this step is substantially the same as step 103 in the embodiment of the present application, and will not be described again here.

Step 404, obtaining the current communication quality and/or current communication load before the resource allocation of the DSS cell group.

In an embodiment, before allocating resources to the DSS cell group, the current communication quality and/or the current communication load of the DSS cell group need to be recorded.

Step 405, determining the resource allocation strategy of the DSS cell group according to the difference between the first predicted communication load and the second predicted communication load, and allocating resources to the DSS cell group according to the resource allocation strategy.

In an embodiment, this step is substantially the same as step 104 in the embodiment of the present application, and will not be described again here.

Step 406, obtaining the first communication quality and/or the first communication load after resource allocation of the DSS cell group.

In an embodiment, after the resource allocation of the DSS cell group is completed, the first communication quality and/or the first communication load of the DSS cell group after resource allocation needs to be recorded.

Step 407, obtaining the quality difference between the current communication quality and the first communication quality, and/or obtaining the load difference between the current communication load and the first communication load.

In an embodiment, according to the recorded current communication quality and the first communication quality, the quality difference before and after resource allocation of the DSS cell group is obtained; and/or according to the recorded current communication load and the first communication load, the load difference before and after resource allocation of the DSS cell group is obtained.

Step 408, when the quality difference and/or load difference meet the preset difference tolerance conditions, waiting for the next resource allocation period of the DSS cell group; otherwise, sending an alarm message to the administrator of the DSS cell group.

In an embodiment, after obtaining the quality difference and/or the load difference, it is necessary to detect whether the quality difference and/or the load difference satisfy the preset difference tolerance condition. When the quality difference and/or the load difference satisfy the difference tolerance condition, it means that changes in the communication quality and/or communication load before and after resource allocation of the DSS cell group are within the normal range, and determining the resource allocation method of the DSS cell group continues to wait for the next resource allocation period of the DSS cell group. When the quality difference and/or load difference do not meet the difference tolerance conditions, it means that changes in the communication quality and/or communication load before and after resource allocation of the DSS cell group are abnormal. At this time, it is necessary to stop determining the resource allocation method of the DSS cell group and send alarm information to the administrator of the DSS cell group, so that the administrator can reset the resource allocation method of the DSS cell group.

The embodiment of the present application, on the basis of other embodiments, can also compare the communication load and communication quality before and after resource allocation to determine whether the determination method for the resource allocation strategy is reasonable, making the present application more intelligent.

The division of steps in the various methods above is only for the purpose of clear description. During implementation, it can be combined into one step or some steps can be split into multiple steps. As long as they include the same logical relationship, they are all within the scope of the present application. Adding insignificant modifications or introducing insignificant designs to the algorithm or process, but not changing the core design of the algorithm and process, are within the scope of the present application.

Figure 5:
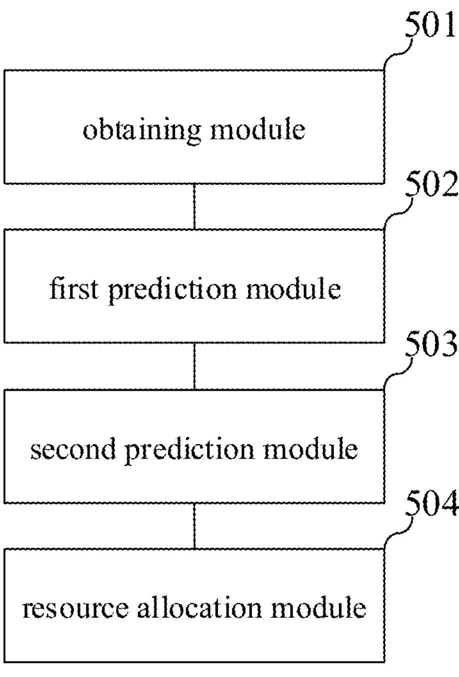
FIG. 5 is a schematic structural diagram of a resource allocation apparatus according to an embodiment of the present application.

Another embodiment of the present application relates to a resource allocation apparatus. The details of the resource allocation apparatus of this embodiment are described in detail below. The following content is only an implementation detail provided for the convenience of understanding and is not necessary to implement this embodiment. FIG. 5 is a schematic diagram of the resource allocation apparatus in this embodiment, including: an obtaining module 501, a first prediction module 502, a second prediction module 503 and a resource allocation module 504.

The obtaining module 501 is configured to obtain the first communication load array of the first historical period of the specified DSS cell group.

The first prediction module 502 is configured to obtain the first predicted communication load of the DSS cell group according to the first communication load array based on a preset prediction algorithm.

The second prediction module 503 is configured to predict the communication load of the DSS cell group according to the preset communication load prediction model, and obtain the second predicted communication load of the DSS cell group. The communication load prediction model is obtained by training based on the second communication load array of the second historical period of the DSS cell group, and the second historical period is greater than the first historical period.

The resource allocation module 504 is configured to determine the resource allocation strategy of the DSS cell group according to the difference between the first predicted communication load and the second predicted communication load, and allocate resources to the DSS cell group according to the resource allocation strategy.

It is not difficult to find that this embodiment is a system embodiment corresponding to the above method embodiment, and this embodiment can be implemented in cooperation with the above method embodiment. The relevant technical details and technical effects mentioned in the above embodiment are still valid in this embodiment, and will not be described again in order to reduce duplication. Correspondingly, the relevant technical details mentioned in this embodiment can also be applied to the above embodiments.

It should be noted that this system embodiment mainly describes the resource allocation method provided by the method embodiment at the software implementation level. Its implementation also needs to rely on hardware support. For example, the functions of related modules can be deployed on the processor, so that the processor can implement corresponding functions. In particular, the relevant data generated by the operation can be stored in the memory for subsequent inspection and use.

It is worth mentioning that each module involved in this embodiment is a logical module. In practical applications, a logical unit can be a physical unit, or a part of a physical unit, or a combination of multiple physical units. In addition, in order to highlight the innovative part of the present application, units that are not closely related to solving the technical problems raised in the present application are not introduced in this embodiment, but this does not mean that other units do not exist in this embodiment.

Figure 6:
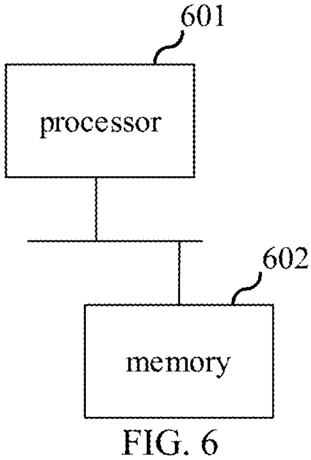
FIG. 6 is a schematic structural diagram of a server according to an embodiment of the present application.

Another embodiment of the present application relates to a server, as shown in FIG. 6, including: at least one processor 601; and a memory 602 communicated with the at least one processor 601. An instruction executed by the at least one processor 601 is stored in the memory 602. The instruction is executed by the at least one processor 601, so that the at least one processor 601 can perform the resource allocation methods in the above embodiments.

The memory and the processor are connected using a bus. The bus can include any number of interconnected buses and bridges. The bus connects one or more processors and various circuits of the memory together. The bus may also connect various other circuits such as peripheral circuits, voltage regulators, and power management circuits together, which are all well known in the art and therefore will not be described further herein. The bus interface provides the interface between the bus and the transceiver. A transceiver may be one element or multiple elements, such as multiple receivers and transmitters, providing a unit for communicating with various other devices over a transmission medium. The data processed by the processor is transmitted over the wireless medium through the antenna. Further, the antenna also receives the data and transmits the data to the processor.

The processor is responsible for managing the bus and general processing, and can also provide a variety of functions, including timing, peripheral interfaces, voltage regulation, power management, and other control functions. The memory can be used to store data used by the processor when performing operations.

An embodiment of the present application relates to a computer-readable storage medium on which a computer program is stored. The above method embodiments are implemented when the computer program is executed by the processor.

Those skilled in the art can understand that all or part of the steps in the methods of the above embodiments can be completed by instructing relevant hardware through a program. The program is stored in a storage medium and includes several instructions to cause a device (which can be a microcontroller, a chip, etc.) or a processor to perform all or part of the steps of the methods described in various embodiments of the present application. The aforementioned storage media include: U disk, mobile hard disk, read-only memory (ROM), random access memory (RAM), magnetic disk or optical disk and other media that can store program code.

Those skilled in the art can understand that the above-mentioned embodiments are specific examples for implementing the present application, and in actual applications, various changes can be made in form and details without departing from the scope of the embodiments of the present application.

What is claimed is:

1. A resource allocation method, comprising:

obtaining a first communication load array of a first historical period of a specified dynamic spectrum sharing (DSS) cell group;

based on a preset prediction algorithm, obtaining a first predicted communication load of the DSS cell group according to the first communication load array;

predicting a communication load of the DSS cell group according to a preset communication load prediction model to obtain a second predicted communication load of the DSS cell group, wherein the communication load prediction model is obtained by training based on a second communication load array of a second historical period of the DSS cell group, and the second historical period is greater than the first historical period; and determining a resource allocation strategy of the DSS cell group according to a difference between the first predicted communication load and the second predicted communication load, and allocating resources to the DSS cell group according to the resource allocation strategy.

2. The resource allocation method of claim 1, wherein the resource allocation strategy comprises: allocating resources according to the first predicted communication load, allocating resources according to the second predicted communication load, and allocating resources according to an original resource allocation strategy of the DSS cell group; the method further comprises:

in response to that the resource allocation strategy of the DSS cell group is to allocate resources according to the first predicted communication load, adding one to a value of first resource allocation number of the DSS cell group; and in response to that the value of the first resource allocation number meets a preset third threshold, updating the communication load prediction model.

3. The resource allocation method of claim 1, wherein determining the resource allocation strategy of the DSS cell group according to the difference between the first predicted communication load and the second predicted communication load comprises:

detecting whether the difference falls within a preset load difference range;

in response to that the difference falls within the load difference range, adding one to a value of number of times that the difference of the DSS cell group falls within the load difference range, and detecting whether the value of the number of times that the difference falls within the load difference range meets a first threshold; in response to that the value of the number of times that the difference falls within the load difference range meets the first threshold, allocating, by the resource allocation strategy, resources according to the second predicted communication load; or in response to that the value of the number of times that the difference falls within the load difference range does not meet the first threshold, allocating, by the resource allocation strategy, resources according to an original resource allocation strategy of the DSS cell group; or in response to that the difference does not fall within the load difference range, adding one to the value of the number of times that the difference of the DSS cell group does not fall within the load difference range, and detecting whether the value of the number of times that the difference does not fall within the load difference range meets a second threshold; in response to that the value of the number of times that the difference does not fall within the load difference range meets the second threshold, allocating, by the resource allocation strategy, resources according to the first predicted communication load; in response to that the value of the number of times that the difference does not fall within the load difference range does not meet the second threshold, allocating, by the resource allocation strategy, allocate resources according to the original resource allocation strategy.

4. The resource allocation method of claim 1, wherein predicting the communication load of the DSS cell group according to the preset communication load prediction model comprises:

obtaining a cell group identifier of the DSS cell group, and identifying a scene of the DSS cell group to obtain a scene identifier; and obtaining the communication load prediction model corresponding to the cell group identifier and the scene identifier from a preset model database.

5. The resource allocation method of claim 4, further comprising:

in response to that the communication load prediction model corresponding to the cell group identifier and the scene identifier is not obtained from the model database, obtaining a general communication load prediction model from the model database as the communication load prediction model.

6. The resource allocation method of claim 4, further comprising:

obtaining the second communication load array of the second historical period of the DSS cell group in each scene;

for each of the scenes, based on a preset loss function, inputting the second communication load array corresponding to the scene into a pre-training model for training, and generating the communication load prediction model corresponding to the scene; and saving the communication load prediction model corresponding to the scene to the model database according to the DSS cell group and the scene.

7. The resource allocation method of claim 1, wherein before allocating the resources to the DSS cell group according to the resource allocation strategy, the method further comprises:

obtaining current communication quality and/or current communication load of the DSS cell group before resource allocation;

after allocating the resources to the DSS cell group according to the resource allocation strategy, the method further comprises:

obtaining first communication quality and/or first communication load of the DSS cell group after resource allocation;

obtaining a quality difference between the current communication quality and the first communication quality, and/or obtaining a load difference between the current communication load and the first communication load;

in response to that the quality difference and/or the load difference meet a preset difference tolerance condition, waiting for next resource allocation period of the DSS cell group; or in response to that the quality difference and/or the load difference do not meet the preset difference tolerance condition, sending alarm information to an administrator of the DSS cell group.

8. A resource allocation apparatus, comprising:

an obtaining module, configured to obtain a first communication load array of a first historical period of specified dynamic spectrum sharing (DSS) cell group;

a first prediction module, configured to obtain first predicted communication load of the DSS cell group according to the first communication load array, based on a preset prediction algorithm;

a second prediction module, configured to predict communication load of the DSS cell group according to a preset communication load prediction model, and obtaining second predicted communication load of the DSS cell group, wherein the communication load prediction model is obtained by training based on the second communication load array of the second historical period of the DSS cell group, and the second historical period is greater than the first historical period; and a resource allocation module, configured to determine a resource allocation strategy of the DSS cell group based on a difference between the first predicted communication load and the second predicted communication load, and allocate resources to the DSS cell according to the resource allocation strategy.

9. A server, comprising:

at least one processor; and, a memory communicated with the at least one processor;

wherein an instruction executable by the at least one processor is stored in the memory, and the instruction is executed by the at least one processor to enable the at least one processor to perform the resource allocation method of claim 1.

10. A non-transitory computer-readable storage medium, wherein a computer program is stored on the non-transitory computer-readable storage medium, and when the computer program is executed by a processor, the resource allocation method of claim 1 is implemented.

* * * * *